(12) United States Patent
Heller

(10) Patent No.: US 6,589,029 B1
(45) Date of Patent: Jul. 8, 2003

(54) SELF-CONTAINED MOTOR DRIVEN HYDRAULIC SUPPLY UNIT

(75) Inventor: Roland Heller, Kornwestheim (DE)

(73) Assignee: Bosch Rexroth AG, Lohr/Main (DE)

( * ) Notice: Subject to any disclaimer, the term of this patent is extended or adjusted under 35 U.S.C. 154(b) by 0 days.

(21) Appl. No.: 10/018,508
(22) PCT Filed: Apr. 14, 2000
(86) PCT No.: PCT/EP00/03376
§ 371 (c)(1), (2), (4) Date: Nov. 2, 2001
(87) PCT Pub. No.: WO00/68572
PCT Pub. Date: Nov. 16, 2000

(30) Foreign Application Priority Data

May 5, 1999 (DE) .......................... 199 20 563

(51) Int. Cl.[7] .............................. F04B 17/00; F04B 1/04; F04B 49/00
(52) U.S. Cl. ................... 417/415; 417/357; 417/273; 417/63; 417/32
(58) Field of Search ............................. 417/32, 63, 273, 417/349, 357, 415, 366

(56) References Cited

U.S. PATENT DOCUMENTS

| 2,321,126 A | * | 6/1943 | Breuer ........................ 417/367 |
| 2,738,122 A | * | 3/1956 | Gardiner ...................... 417/360 |
| 3,010,401 A | * | 11/1961 | Granqvist ..................... 417/32 |
| 3,479,541 A | | 11/1969 | Robinson |
| 3,992,133 A | | 11/1976 | Brunner |
| 4,398,108 A | | 8/1983 | Danilevich et al. |
| 5,616,973 A | * | 4/1997 | Khazanov et al. ............. 310/54 |

FOREIGN PATENT DOCUMENTS

| DE | 3513472 | 10/1986 |
| DE | 19513286 | 10/1995 |
| EP | 0198250 | 10/1986 |

* cited by examiner

Primary Examiner—Charles G. Freay
Assistant Examiner—Timothy P. Solak
(74) Attorney, Agent, or Firm—Martin A. Farber

(57) ABSTRACT

A compact hydraulic supply unit has a housing forming a reservoir for a pressure fluid, and includes a housing bottom, a housing cover and a housing middle part therebetween in the form of a profiled tube. An electric motor has a laminated stator core held by the housing middle part, and drives a pump located at the housing bottom. The housing middle part has axially extending internal holding Webs for holding the laminated stator core. The size of the housing middle part is independent of the size of the electric motor, so that, with a low structural height, the housing can be so formed that it accepts a larger volume of pressure fluid.

18 Claims, 2 Drawing Sheets

SELF-CONTAINED MOTOR DRIVEN HYDRAULIC SUPPLY UNIT

FIELD AND BACKGROUND OF THE INVENTION

The invention relates to a compact hydraulic aggregate which possesses a housing forming a reservoir for a pressure fluid, which comprises a housing bottom, a housing cover and a housing middle part therebetween in the form of a profiled tube, an electric motor located in the housing whose in stator laminated core is held by the housing middle part and which can be connected to an electricity network via a connection box on the housing cover, and a pump located within the housing in the region of the housing bottom and capable of being driven by the electric motor.

Such a compact hydraulic aggregate is known, for example, from DE 35 13 472 C2. In such a hydraulic aggregate, the housing may also be regarded as the housing of the electric motor. The rotor and stator of the electric motor are more or less deeply immersed into the pressure fluid, depending on how much oil has been introduced into the reservoir and how much pressure fluid is specifically received by the hydraulic user or users which are supplied with pressure fluid by the pump. The heat generated by the electric motor and the heat introduced into the reservoir by the pressure fluid is released to the environment via the housing. In some circumstances, the pressure fluid, when flowing back from the hydraulic user, additionally passes through an oil cooler in order to reduce the input of heat into the reservoir. This oil cooler may be directly affixed to the hydraulic aggregate.

The housing middle part of the known hydraulic aggregate is of circular cross-sectional form internally in the region of the stator laminated core of the electric motor. An exchange of pressure fluid between the spaces in front of the two end faces of the stator laminated core is evidently to take place via channels in the stator laminated core.

In the known compact hydraulic aggregate, the internal diameter of the housing middle part is determined by the external diameter of the stator laminated core, so that, for a given stock of pressure fluid, a particular height of the hydraulic aggregate results, whereby the placement of the hydraulic aggregate adjacent to a machine is sometimes prevented. In addition, the flow cross section is small because of the channels of the stator laminated core accepting the coils. In some circumstances, additional longitudinal channels have to be made in the stator laminated core, which results in an electric motor of special design.

SUMMARY OF THE INVENTION

It is an object of the present invention further to develop a compact hydraulic aggregate having the features of the introductory-mentioned paragraph in such a manner that, especially if additional members are built on, it can be produced cost-effectively. In addition, a low structural length is to be possible for a given pressure fluid storage volume.

This object is achieved, according to the invention, in that a compact hydraulic aggregate having the introductory-mentioned features is additionally equipped with features wherein holding webs make the external diameter of the stator laminated core and the internal diameter of the housing middle part independent of one another, as it were, and the housing middle part can be formed independently of the size of the electric motor to suit the desired storage volume of the pressure fluid and in the interests of a small structural length of the hydraulic aggregate. There is a great deal of free space between the holding webs for the completely unobstructed exchange of pressure fluid between the two spaces in front of the end faces of the stator laminated core. The heat generated in the electric motor is guided outward via the holding webs and released to the environment via the outer surface of the housing middle part.

Particularly preferably, the housing middle part has the external shape of a polygon, in particular a regular polygon. In this arrangement, a partial surface between two corners should lie diametrally opposite a further partial surface, so that the housing middle part can be well clamped for machining. In addition, a component which is externally angular can be stacked better than a circular component. The holding webs advantageously each extend at the center of an external partial surface of the housing middle part lying between two corners, so that the accumulation of material in the corners does not become too great.

An embodiment of the invention is also particularly preferred wherein the housing middle part comprises a further axially extending internal web between two holding webs for the stator laminated core of the electric motor, which further web is broader in the circumferential direction of the housing middle part than the holding webs and serves to secure a monitoring member located externally on the housing. For example, threaded holes can be drilled in the further web to permit the attachment of an oil level display glass.

This further holding web is also preferably located at the center of an external partial surface of the polygonal housing middle part, so that a level installation surface for the monitoring member is provided externally.

As has already been indicated, the compact hydraulic aggregate can additionally be equipped with an oil cooler which is disposed in the region of the housing bottom, for example even below the housing bottom. Preferably, the fan wheel of this oil cooler is driven by a further electric motor, so that no shaft need be guided out from the housing forming the reservoir. According to a feature of the invention provision is now made, in an advantageous manner, for the supply cable for the electric motor to be guided in an axially extending cable duct of the housing middle part to the housing cover, and especially into the connection box there. The supply cable is thus largely protected against damage. In particular, the cable duct also extends within the housing bottom and the housing cover, so that the cable is not visible at all from outside.

A temperature sensor, which can be used, for example, for switching an existing oil cooler on and off or, if no oil cooler is present, switches off the electric motor driving the pump is advantageously disposed in accordance with other features of the invention wherein the electrical connection line of the temperature sensor thus extends freely neither inside nor outside the housing.

BRIEF DESCRIPTION OF THE DRAWINGS

An example of embodiment of a compact hydraulic aggregate according to the invention is illustrated in the drawing. The invention will now be explained in detail with reference to the figures of this drawing.

In the figures.

DETAILED DESCRIPTION OF THE PREFERRED EMBODIMENT

Figure 1:
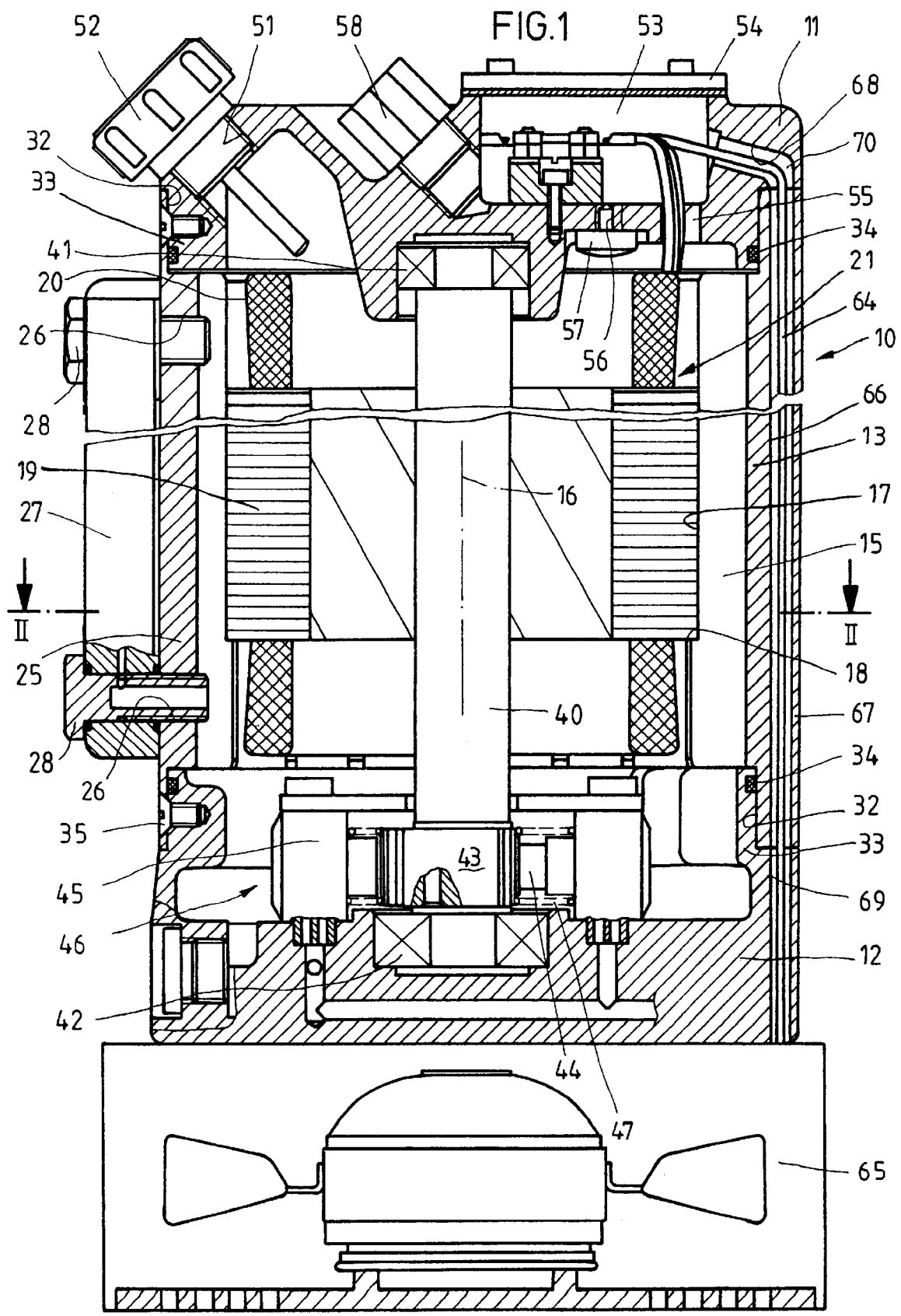
FIG. 1 shows a longitudinal section through the example of embodiment equipped with an oil cooler, an oil level display glass and a temperature sensor.

The compact hydraulic aggregate shown possesses a housing 10, which on the one hand performs the function of the reservoir for the pressure fluid used for operation and in addition can also be regarded as a housing of an electric motor. This housing has, as essential parts, a housing cover 11, a housing bottom 12 and a housing middle part 13. The latter is a section of a profiled pipe produced from an aluminum alloy and has been finally machined. The outside of the housing middle part 13 is formed as a regular sixteen-sided figure with individual partial surfaces 14 between two corners. On the inside of the peripheral wall of the housing middle part 13, a total of twelve holding webs 15 En extend toward the axis 16 of the housing middle part 13. These holding webs are grouped in four sets of three holding webs each, the three holding webs 15 of each group being located at the centers of three consecutive outer partial surfaces 14. Between the four sets of holding webs 15 is, in each case, an outer partial surface 14 on which no holding web 15 is present internally. The holding webs 15 are hollowed out over a particular axial distance from one end face of the housing middle part 13, so that, on each holding web 15, a radially inward-pointing partial surface 17 in the shape of a regular cylinder, lying on a regular cylinder with the corresponding partial surfaces 17 of the other holding webs 15, and an axial bearing shoulder 18 are formed. From one side, the stator laminated core 19 and the stator of an electrical motor 21, having the coils 20, are pushed into the housing middle part 13 with pressure fit as far as the bearing shoulder 18.

Inwardly and at the center of one of the partial surfaces 14 between two sets of holding webs 15, the housing part 13 is provided with a further web 25 extending in the longitudinal direction, this further web 25 extending less far radially inward than the holding webs 15 and being thicker than the holding webs 15 in the circumferential direction of the housing middle part 13. In the region of the holding web 25, two holes 26 are drilled opposite one another in the axial direction into the housing middle part 13 and have been provided with a thread. As a result of the web 25, the holes 26 have become long enough to serve for the attachment of an oil level display glass 27 by means of two screws 28. The hydraulic aggregate shown is provided for operation in a vertical arrangement in which the axis of the housing middle part 13 extends vertically. The lower screw 28 in this arrangement always dips into the oil internally. Via a blind hole therein, in the manner of communicating tubes, a fluid connection exists between the interior of the housing 10 and the display glass 27. The upper screw 28 is of exactly the same form as the lower screw 28, in order that, in the event of a changing fluid level, air can escape from the display glass 27 or flow into the display glass. Because the web 25 is located at the center of a partial surface 14, the display glass 27 lies flat with corresponding contact surfaces on the corresponding partial surface 14 of the housing middle part 13, without being unacceptably stressed. The housing middle part 13 has the internal form of a circular regular cylinder between the webs 15 and 25.

Figure 2:
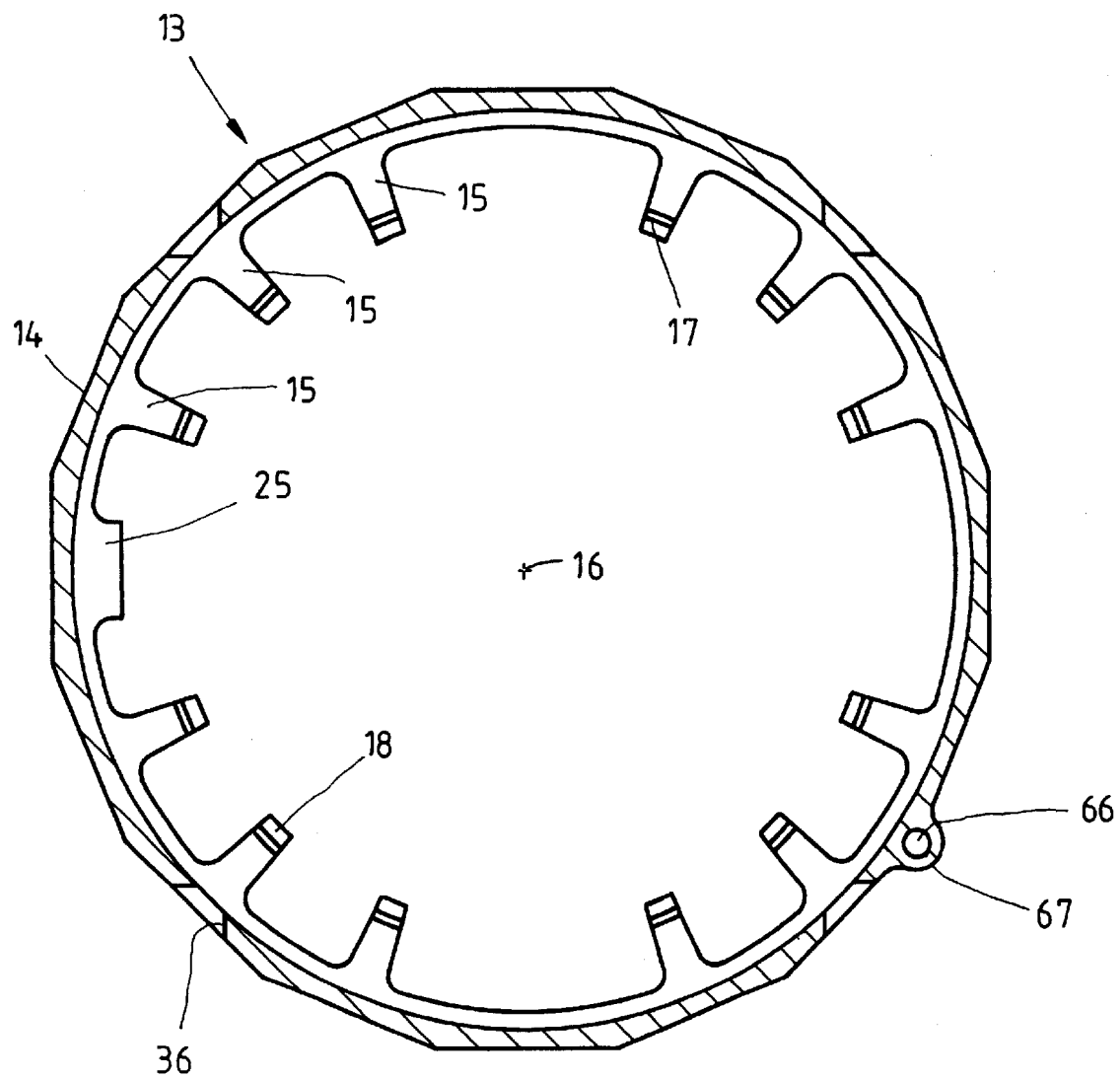
FIG. 2 shows a section through the housing middle part alone, along the line II—II in FIG. 1.

At each end surface, the housing middle part 13 has a hollowed-out portion 32 extending from that end surface over a certain axial extent and reaching radially outward into the region of the circumferential wall of the housing middle part 13, in the region of which the webs 15 and 25 are thus fully hollowed-out. The housing cover 11 engages into one recess 32 and the housing bottom 12 into the other hollowed-out portion, with one centering collar 33 in each case. Located in a circumferential channel of each centering collar 33 is a gasket 34, by means of which the gap is sealed relative to the housing parts. The housing cover, housing bottom and housing middle part are fixed to one another by radially driven flat-headed screws 35 in the region of the hollowed-out portions 32 and of the centering collars 33 which, as can be seen from the conical apertures 36 in the circumferential wall of the housing middle part 13 visible in FIG. 2, lie at the center of each partial surface 14.

The shaft 40 of the rotor of the electric motor 21 is mounted by means of a bearing journal at each end in a rolling bearing, 41 and 42 respectively, which is inserted into a seating of the housing cover 11 or of the housing bottom 12. Just above the rolling bearing 42 in the housing bottom 12, the shaft 40 bears a twist-proof centering ring 43 toward which the radial pistons 44 of individual pump members 45 of a radial piston pump 46 fixed to the housing bottom 12 are urged by a compression spring 47. In the event of rotation of the shaft 40, the radial pistons 44 perform suction strokes during which pressure fluid is aspirated from the interior of the housing 10, and pressure strokes, during which they force the aspirated pressure fluid to a pressure outlet (not shown in detail).

Located in the housing cover 11 is a filling aperture 51, which is closed by a screw closure 52. In addition, the housing cover 11 comprises a recess 53, initially open outward in the direction of the axis 16 of the shaft 40, by which a connection box for the hydraulic aggregate is formed. The connection box 53 is covered by a plate 54 with the interposition of a seal. A connection support produced from an electrically insulating material is fixed on the bottom of the connection box 53 and a plurality of connections are provided thereon for the fixing and connecting of electrical lines. A bundle of lines leads through an aperture 55 in the bottom of the connection box 53 into the interior of the housing 10 to the coils of the electric motor 21. Also provided in the bottom of the connection box 53 is a through threaded hole 56, into which a temperature sensor 57 is screwed from the interior of the housing 10. The connecting lines of the temperature sensor 57 lead directly through the threaded attachment of the temperature sensor screwed into the threaded hole 56 into the connection box 53, but for which they would hang free in the interior of the housing 10. A connecting cable for supplying the electric motor 21 can enter the connection box 53 through the screw connection 58.

Below the housing bottom 12 is disposed an oil cooler 65 with an electrically driven fan wheel. The electric motor of the oil cooler is connected to current via cable 64 which is guided from the electric motor into the connection box 53. To prevent this cable 64, first, from being externally accessible on the hydraulic aggregate and thus capable of being damaged and making the handling of the hydraulic aggregate more difficult, and secondly to prevent additional sealing points being necessary where the cable runs in the interior of the housing, a duct 66 is provided in the wall of the housing middle part 13 which extends in the axial direction along the housing middle part 13 and is guided externally past the gaskets 34. In order to sufficient housing material to be available for a duct 66 that is continuous all round, an outward curvature 67 is provided on the housing middle part 13 in the region of a corner between two partial surfaces 14. Attention is drawn to the fact that this outward curvature 67 is drawn at a different position in FIG. 1 from that shown in FIG. 2, in order to enable it be shown in the sectional view according to FIG. 1. The outward curvature 67 is continued in the form of corresponding outward curvatures of the housing cover 11 and of the housing bottom 12, in order to enable the duct 66 also to be extended into these parts. At the housing bottom, the duct 66 opens directly and axially into the oil cooler 65. In the housing cover 11, however, the duct 66 angles out of the axial direction into an oblique hole 68 which begins from a wall of the connection box 53. Prom the connection box 53, the cable 64 extends through the oblique hole 68 and the longitudinal duct 66 to the oil cooler 65. It is thus protected against any damage.

What is claimed is:

1. A compact hydraulic aggregate having a housing (10) forming a reservoir for a pressure fluid and comprising a housing bottom (12), a housing cover (11) and a housing middle part (13) therebetween in form of a profiled tube, having, located in the housing (10), an electric motor (21) whose stator laminated core (19) is held by the housing middle part (13), and which can be connected to an electrical network via a connection box (53) on the housing cover (11), and having a pump (46) located within the housing (10) in a region of the housing bottom (12) and capable of being driven by the electric motor (21), wherein the housing middle part (13) comprises axially extending holding webs (15) which are directed inwardly to engage at respective positions the stator laminated core (19) of the electric motor (21) to hold the stator core, and wherein there are plural sets of the holding webs located respectively at successive locations around the housing, each set having a plurality of the webs.

2. The compact hydraulic aggregate as claimed in claim 1, wherein the housing middle part (13) has an external shape of a regular polygon.

3. The compact hydraulic aggregate as claimed in claim 1, wherein an electrical temperature sensor (57) is disposed in the housing cover (11) below a connection box (53) and its electrical connecting lines lead from the connecting box (53), through material of the housing cover (11), directly to the temperature sensor (57).

4. The compact hydraulic aggregate as claimed in claim 3, wherein said temperature sensor (57) is disposed in a hole (56) extending from the connection box (53).

5. The compact hydraulic aggregate as claimed in claim 4, wherein the opening holding the temperature sensor (57) has screw threads permitting an insertion of the temperature sensor from inside of the housing cover (11) into said hole (56) extending from the connection box (53), the electrical connecting lines of the temperature sensor (57) also passing through said hole (56).

6. The compact hydraulic aggregate as claimed in claim 3, herein the temperature sensor is secured by screw threads in the hole.

7. A compact hydraulic aggregate having a housing (10) forming a reservoir for a pressure fluid and comprising a housing bottom (12), a housing cover (11) and a housing middle part (13) therebetween in form of a profiled tube, having, located in the housing (10), an electric motor (21) whose stator laminated core (19) is held by the housing middle part (13), and which can be connected to an electrical network via a connection box (53) on the housing cover (11), and having a pump (46) located within the housing (10) in a region of the housing bottom (12) and capable of being driven by the electric motor (21), wherein the housing middle part (13) comprises axially extending holding webs (15) by which the stator laminated core (19) of the electric motor (21) is held; and wherein the housing middle part (13) comprises a further axially extending internal web (25) disposed in a first angular region located between a first set of webs and a second successive set of webs of said holding webs (15) and being broader in circumferential direction of the housing middle part (13) than the holding webs (15), the internal web (25) serving to secure a monitoring member (27) disposed externally on the housing (10).

8. The compact hydraulic aggregate as claimed in claim 7, herein said further internal web (25) extends radially inward less than said holding webs (15).

9. The compact hydraulic aggregate as claimed in claim 8, wherein angular distance of said first angular region is greater than the angular distance of a second angular region defined by third and fourth adjacent webs of said holding webs (15).

10. The compact hydraulic aggregate as claimed in claim 9, wherein a gap of the same size as a gap between the two holding webs (15) adjacent to the further web (25) exists opposite the further web (25) relative to an axis (16) of the housing middle part (13).

11. A compact hydraulic aggregate having a housing (10) forming a reservoir for a pressure fluid and comprising a housing bottom (12), a housing cover (11) and a housing middle part (13) therebetween in form of a profiled tube, having, located in the housing (10), an electric motor (21) whose stator laminated core (19) is held by the housing middle part (13), and which can be connected to an electrical network via a connection box (53) on the housing cover (11), and having a pump (46) located within the housing (10) in a region of the housing bottom (12) and capable of being driven by the electric motor (21), wherein the housing middle part (13) comprises axially extending holding webs (15) by which the stator laminated core (19) of the electric motor (21) is held; and further comprises an electrical device having a further electric motor and a fan wheel driven by the further electric motor, disposed in the region of the housing bottom (12), and wherein a supply cable (64) for the electrical device is guided in an axially extending cable duct (66) of the housing middle part (13) to the housing cover (11).

12. The compact hydraulic aggregate as claimed in claim 5, herein the housing middle part (13) has a curvature (67) extending axially outward, within which said cable duct (66) extends.

13. The compact hydraulic aggregate as claimed in claim 5, wherein the cable duct (66) is located radially outside a seal (34) disposed between the housing middle part (13) and the housing bottom (12) or the housing cover (11).

14. The compact hydraulic aggregate as claimed in claim 11, wherein the cable duct (66) of the housing middle part (13) continues in holes (68, 69, 70) drilled in the housing cover (11) and the housing bottom (12).

15. The compact hydraulic aggregate as claimed in claim 14, wherein the housing middle part (13) is hollowed out inward from two ends and wherein the housing bottom (12) and housing cover (11) each engage by means of a centering collar (33) into a hollowed-out portion (32), wherein a radial seal (34) is disposed in the hollowed-out portion (32) between the housing middle part (13) and the housing bottom (12) or the housing cover (11), and wherein the cable duct (66) extends outside the hollowed-out portion (32) in the housing middle part (13).

16. The compact hydraulic aggregate as claimed in claim 11, wherein the electrical device is an oil cooler.

17. A compact hydraulic aggregate having a housing (10) forming a reservoir for a pressure fluid and comprising a housing bottom (12), a housing cover (11) and a housing middle part (13) therebetween in form of a profiled tube, having, located in the housing (10), an electric motor (21) whose stator laminated core (19) is held by the housing middle part (13), and which can be connected to an electrical network via a connection box (53) on the housing cover (11), and having a pump (46) located within the housing (10) in a region of the housing bottom (12) and capable of being driven by the electric motor (21), wherein the housing middle part (13) comprises axially extending holding webs (15) by which the stator laminated core (19) of the electric motor (21) is held; and wherein the holding webs are located in an arrangement based on a regular polygon circumscribing the housing middle part wherein one of said holding webs (IS) extends at a center of each external partial surface 114) of the polygon circumscribing the housing middle part (13) and lying between two corners of the polygon.

18. A compact hydraulic aggregate having a housing (10) forming a reservoir for a pressure fluid and comprising a housing bottom (12), a housing cover (11) and a housing middle part (13) therebetween in form of a profiled tube, having, located in the housing (10), an electric motor (21) whose stator laminated core (19) is held by the housing middle part (13), and which can be connected to an electrical network via a connection box (53) on the housing cover (11), and having a pump (46) located within the housing (10) in a region of the housing bottom (12) and capable of being driven by the electric motor (21), wherein the housing middle part (13) comprises axially extending holding webs (15) which are directed inwardly to engage at respective positions the stator laminated core (19) of the electric motor (21) to hold the stator core, and wherein each of a plurality of the holding webs is provided with a bearing shoulder (18) for receiving the stator core.

* * * * *